United States Patent [19]
Tanaka

[11] Patent Number: 5,879,257
[45] Date of Patent: Mar. 9, 1999

[54] CHAIN HAVING SEAL WITH ANNULAR SEALING PROJECTION

[75] Inventor: Koji Tanaka, Osaka, Japan

[73] Assignee: Tsubakimoto Chain Co., Osaka-fu, Japan

[21] Appl. No.: 800,578

[22] Filed: Feb. 18, 1997

[30] Foreign Application Priority Data

Feb. 20, 1996 [JP] Japan ................................. 8-031942

[51] Int. Cl.$^6$ .................................................. F16G 13/02
[52] U.S. Cl. ........................ 474/207; 474/206; 474/209
[58] Field of Search ................................. 474/207, 206, 474/202, 209

[56] References Cited

U.S. PATENT DOCUMENTS

| | | | |
|---|---|---|---|
| 2,411,207 | 11/1946 | Hait | 474/207 X |
| 2,411,214 | 11/1946 | Keech | 474/207 X |
| 3,068,712 | 12/1962 | Kuntzmann | 474/207 |
| 3,135,128 | 6/1964 | Rudolph | 474/207 |
| 3,492,885 | 2/1970 | Nolte | 474/207 X |
| 4,094,515 | 6/1978 | Araya et al. | 474/207 X |
| 4,729,754 | 3/1988 | Thuerman | 474/207 |
| 5,459,993 | 10/1995 | Kuriyama et al. | 474/207 X |
| 5,468,376 | 11/1995 | Bates | 474/209 X |

FOREIGN PATENT DOCUMENTS

| | | | |
|---|---|---|---|
| 28 43 562 | 4/1979 | Germany | 474/207 |
| 50-134552 | 11/1975 | Japan . | |
| 483669 | 4/1938 | United Kingdom | 474/207 |

*Primary Examiner*—William Stryjewski
*Attorney, Agent, or Firm*—Armstrong, Westerman, Hattori, McLeland, & Naughton

[57] ABSTRACT

A chain with a seal includes an elastic seal member, wherein the elastic seal member is held any one of an outer plate or an inner plate of the chain. In this way the elastic seal ember is prevented from falling off of the plate. Additionally the elastic seal member is held n either one of the inner plate or the outer plate so as to cover the plate in order to prevent the elastic seal member from falling off of the plate.

3 Claims, 4 Drawing Sheets

5,879,257

CHAIN HAVING SEAL WITH ANNULAR SEALING PROJECTION

FIELD OF THE INVENTION

The present invention relates generally to a chain for a power transmission and conveyance and more particularly, to a chain with a seal capable of preventing leakage of a lubricant sealed between the outer peripheral surface of each connection pin of the chain and the inner peripheral surface of a bushing through which the connection pin is inserted and also capable of preventing the entry of a foreign matter between the outer peripheral surface and the inner peripheral surface.

BACKGROUND OF THE INVENTION

For example, FIG. 8 shows such a conventional chain with a seal as is disclosed in Japanese Utility Model Laid Open No. 134552/75, in which a rubber seal 4 is attached to an inside surface 3A of an outer plate 3 which is opposed to an inner plate 2 on a connection pin 1 of the chain, and an annular sealing projection 4A is projected from the rubber seal 4 so as to abut an outside surface 2A of the inner plate 2 opposed to the outer plate 3 and in a surrounding relation to the connection pin 1.

In the prior art referred to above, since the rubber seal 4 is attached to and held by only the inside surface 3A of the outer plate which surface is a flat surface, there is a fear that the rubber seal 4 may peel and fall off the flat surface of the outer plate 3 due to a difference in the thermal expansion coefficient between the outer plate and the rubber seal.

Once the rubber seal 4 comes off the outer plate 3, the rubber seal performs peristaltic movements due to a relative bending motion of the inner plate 2 and the outer plate 3 around the connection pin 1 and cannot be held in place. Consequently, not only the sealability of the rubber seal is deteriorated but also there may occur accidents of the rubber seal such as damage or destruction.

SUMMARY OF THE INVENTION

The present invention has solved the above-described problem of the conventional chain with a seal by holding an elastic seal on one of either an inner plate or an outer plate so as to cover the one plate. The inner and outer plates are opposed to each other at each connection pin of the chain, and form an annular sealing projection on the elastic seal so as to abut an opposed side of the plate opposed to the one plate and in a surrounding relation to the connection pin. The above-described problems may also be solved by holding an elastic seal on each of the inner plates of the chain so as to cover the inner plate, forming an annular sealing projection on the elastic seal so as to abut an opposed side of an associated outer plate of outer plates opposed respectively to the inner plates and in a surrounding relation to a connection pin of the chain, and also forming a buffer projection on the elastic seal for preventing the generation of noise upon collision of a roller with the inner plate caused by an axial free play of the roller, the roller being rotatably fitted on the outer peripheral surface of a bushing through which the connection pin is inserted.

Since the elastic seal is held on each inner or outer plate of the chain so as to cover the plate, unlike the prior art where a rubber seal is fused onto a flat plate surface, the peripheral edge of each inner or outer plate is covered with the elastic seal, and therefore even if a difference in thermal expansion coefficient occurs between the elastic seal and the plate so that the seal peels from the plate, the seal can be held in a predetermined position without falling off the plate.

BRIEF DESCRIPTION OF THE DRAWINGS

FIG. 3 is an enlarged view of an outer plate shown in FIG. 1, in which

DETAILED DESCRIPTION OF THE INVENTION

Figure 1:
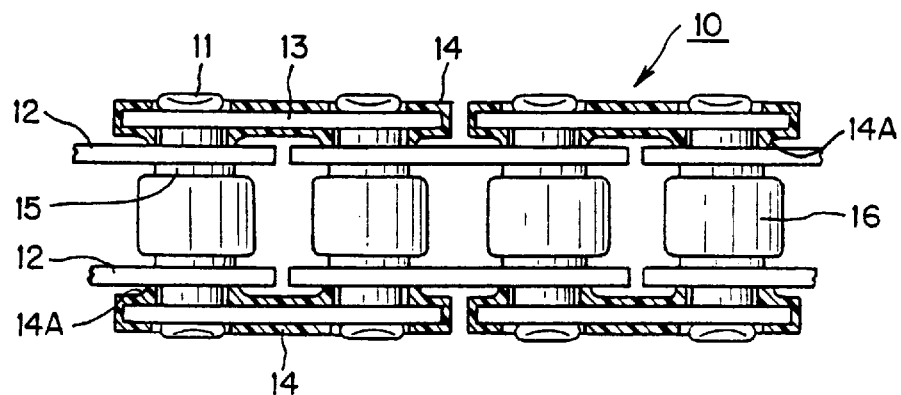
FIG. 1 is a plan view of a principal portion of a chain with a seal embodying the present invention.
Figure 2:
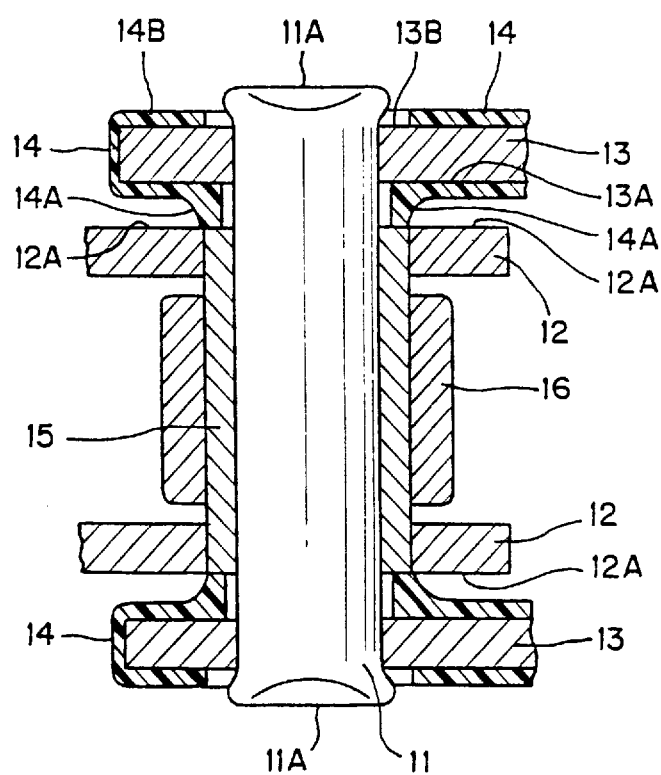
FIG. 2 is an enlarged sectional view of a principal portion shown in FIG. 1.

FIG. 1 is a partially sectional plan view of a principal portion of a chain according to the present invention and FIG. 2 is an enlarged sectional view of the principal portion shown in FIG. 1. A roller chain 10 with seal is provided with a pair of inner plates 12, 12 into which are press-fitted both ends of a bushing 15 and a pair of outer plates 13, 13 through which are inserted both end portions of a connection pin 11, the connection pin 11 being inserted rotatably through the bushing 15. Both end faces 11A, 11A of the connection pin 11 are caulked to form expanded portions so as to prevent dislodgment of the outer plates 13, 13 from the connection pin. Between the paired inner plates 12, 12, a roller 16 is rotatably fitted on the outer periphery of the bushing 15.

An elastic seal 14 is held on each outer plate 13, which is opposed to the associated inner plate on the connection pin 11, so as to cover the outer plate. An annular sealing projection 14A is formed on an opposed surface 13A of the outer plate 13 opposed to the inner plate. The annular sealing projection 14A is abutted against an opposed surface 12A of the inner plate 12 opposed to the outer plate in a surrounding relation to the connection pin 11. The annular sealing projection 14A functions to prevent a lubricant such as grease or lubricating oil sealed between the outer peripheral surface of the connection pin 11 and the inner peripheral surface of the bushing 15 from leaking out from between the opposed surfaces of the inner plate 12 and the outer plate 13 and also functions to prevent a foreign matter such as dust from getting in between the outer peripheral surface of the connection pin and the inner peripheral surface of the bushing through the opposed surfaces.

As is seen from FIG. 2, the elastic seal 14 is held on the outer plate 13 so as to cover the outer plate. More specifically, the elastic seal 14 covers the opposed surface 13A of the outer plate 13 and further covers an outside surface 13B of the outer plate beyond the peripheral edge of the outer plate. Therefore, even in the event of peeling of the opposed surface 13A of the outer plate and the elastic seal 14 from each other, the elastic seal does not fall off the outer plate 13 but keeps a predetermined sealing position thereof.

There are various plate covering forms of the elastic seal, typical of which are shown in FIGS. 3 to 6 with respect to the outer plate. However, these are also true of the inner plate and no limitation is made to the illustrated examples.

Figure 3A:
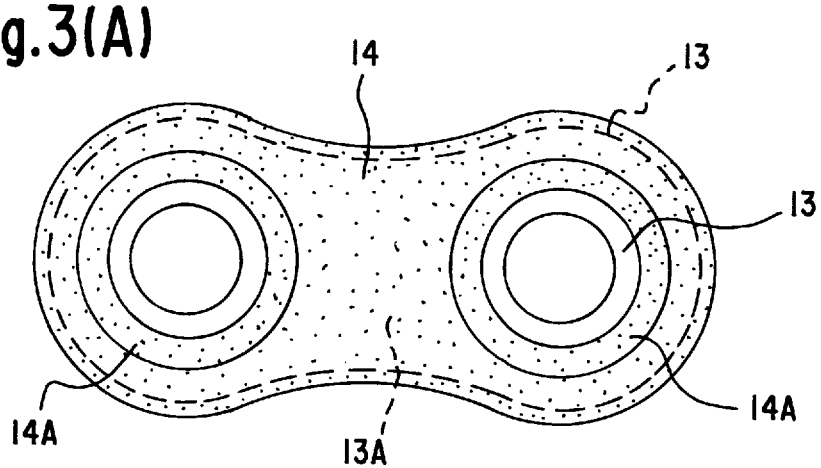
FIG. 3(A) illustrates an inside, or opposed, surface of the outer plate
Figure 3B:
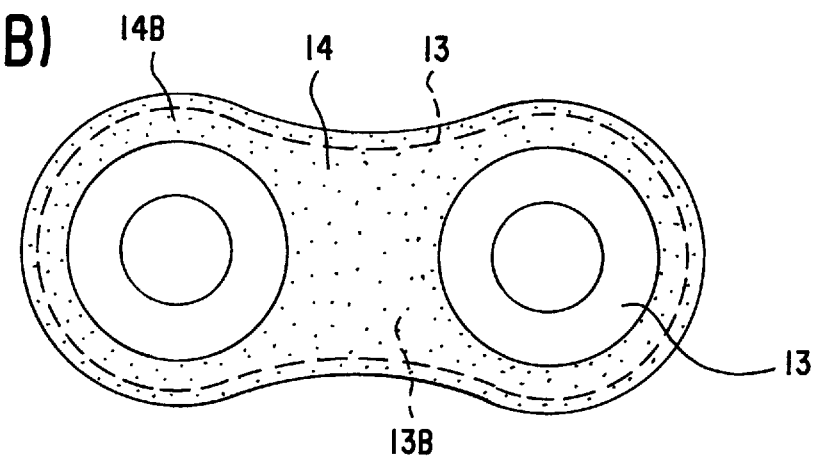
FIG. 3(B) illustrates an outside surface of the outer plate.
Figure 4:
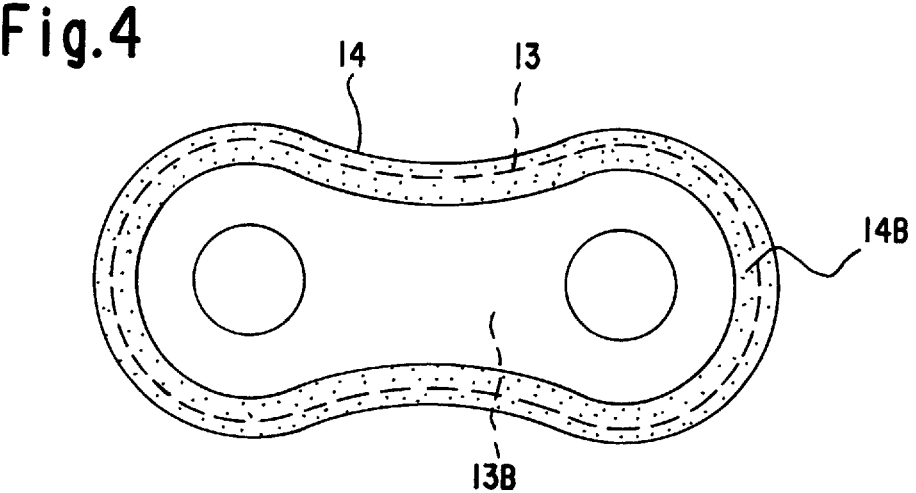
FIG. 4 is an outside surface view of the outer plate, showing one covering mode of an elastic seal according to the present invention.
Figure 5:
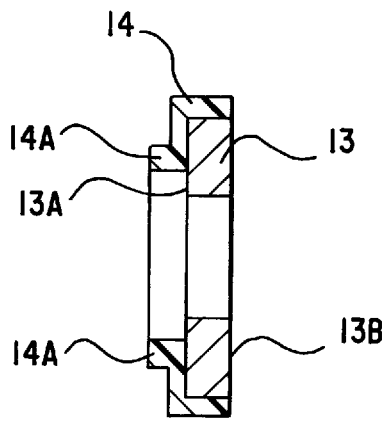
FIG. 5 is a sectional side view of the outer plate, showing another covering mode of an elastic seal according to the present invention.
Figure 6:
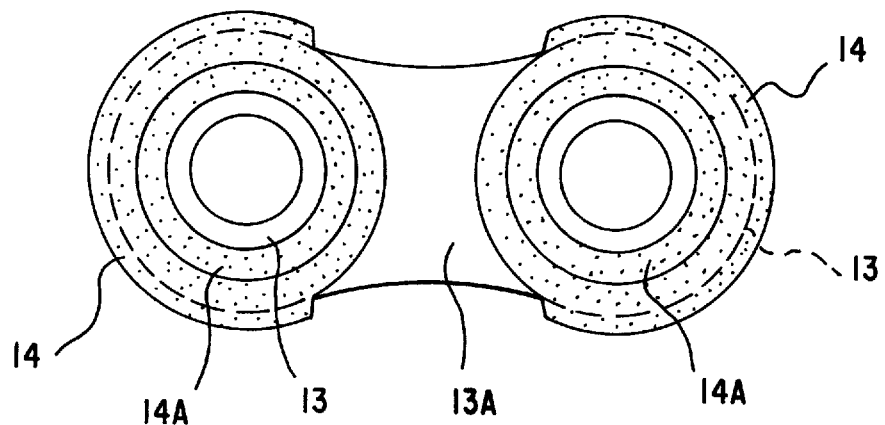
FIG. 6 is an inside, or opposed, surface view of the outer plate, showing a further covering mode of elastic seals according to the present invention.

In FIGS. 3(A) and 3(B), the elastic seal 14 is held so as to cover the whole surface of the outer plate 13 whose peripheral edge contour is indicated with a dotted line. In the same FIGS. 3(A) and 3(B) are enlarged views of the opposed surface 13A and the outside surface 13B, respectively. In FIG. 4, the elastic seal 14 is held on the outer plate 13 by forming a folded-back portion 14B on the outside surface 13B of the outer plate along the peripheral edge of the same plate. The opposed surface 13A of the outer plate 13 is the same as in FIG. 3(A). FIG. 5 is a sectional side view of the outer plate 13, in which the elastic seal 14 does not have a peripheral edge folded-back portion on the outside surface 13B of the outer plate, but it is held by covering the peripheral edge of the outer plate. Further, in FIG. 6, independent elastic seals 14 are held on the opposed surface 13A of the outer plate so as to cover the surrounding portions of connection pins respectively.

The annular sealing projection 14A may be a double ring projection for enhancing the sealability. Further, the projecting end of the annular sealing projection 14A may be abutted against an end face of the bushing 15, or it may be abutted directly against the opposed surface 12A of the inner plate, whereby the space between the outer periphery of the connection pin and the inner peripheral surface of the annular sealing projection is increased and hence the amount of the lubricant held between the connection pin and the bushing is increased.

Figure 7:
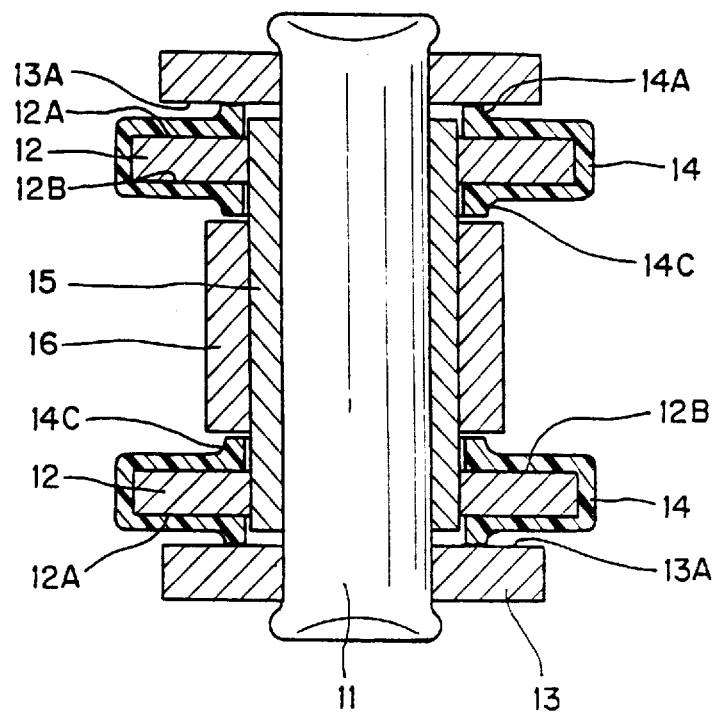
FIG. 7 is an enlarged sectional plan view of a principal portion of a chain according to another embodiment of the present invention.
Figure 8:
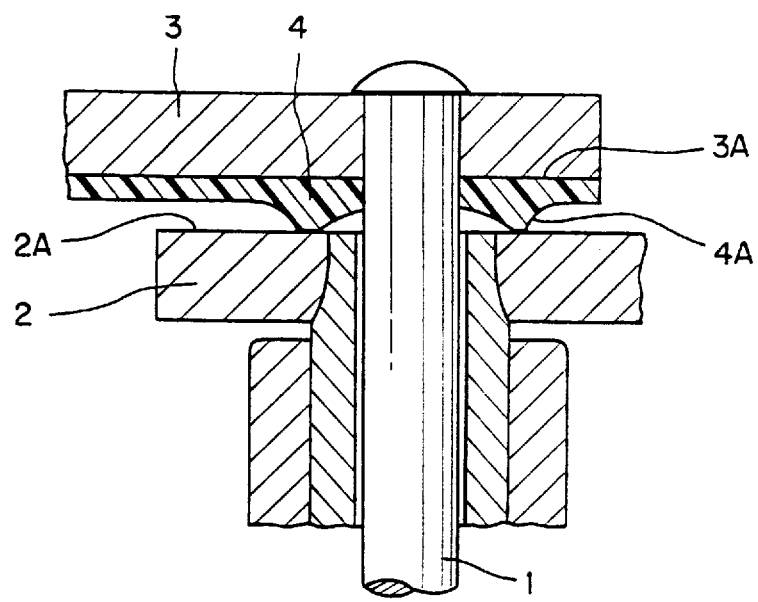
FIG. 8 is an enlarged sectional plan view of a principal portion of a conventional chain with a seal.

Referring now to FIG. 7, there is illustrated another embodiment of the present invention, in which an elastic seal 14 is held so as to cover the whole surface of each inner plate 12, an annular sealing projection 14A is formed on the elastic seal 14 on the side of an opposed surface 12A of the inner plate opposed to an outer plate 13, the annular sealing projection 14A being abutted against an opposed surface 13A of the outer plate 13 opposed to the inner plate 12, and a buffer projection 14C for preventing the generation of a collision noise between a roller 16 and the inner plate caused by axial free play of the roller 16 is formed on the elastic seal 14 on the side of an inside surface 12B of the inner plate 12, the roller 16 being rotatably fitted on a bushing 15.

Since an elastic seal having an annular sealing projection is held on one of inner and outer plates of the chain so as to cover the one plate, the elastic seal does not fall off the plate and can keep a predetermined position thereof even in a bending motion of the chain. Thus, there is no fear of damage or destruction of the elastic seal caused by peristaltic movements of the seal and hence the sealability of the seal is not deteriorated. Besides, the resistance at the time of bending of the chain caused by peristaltic movements of the elastic seal is removed and therefore it is possible to improve the transmission efficiency.

Moreover, when the inner plate is covered with the elastic seal, it is possible to form a buffer projection on the inside surface of the inner plate to buffer the collision of a roller with the inner plate caused by an axial free play of the roller, whereby not only the elastic seal is prevented from falling off the plate but also the collision of an end face of the roller with the inside surface of the inner plate is prevented and hence it is possible to prevent the generation of noise based on such collision.

Further, since the plate peripheral edge is covered with the elastic seal, the generation of collision noise between the plate and a chain guide rail is prevented when the chain is used as a conveyance chain. Besides, the wear of the plate caused by a sliding contact of the plate with the guide rail can be prevented.

What is claimed is:

1. A chain with a seal comprising:

a plurality of inner plates;

a plurality of outer plates, wherein each outer plate of said plurality of outer plates opposes each inner plate of said plurality of inner plates such that an inner surface of each outer plate of said plurality of outer plates faces an outer surface of each inner plate of said plurality of inner plates;

a connection pin located through a hole in each inner plate of said plurality of inner plates and through a hole in each outer plate of said plurality of outer plates so as to be perpendicular to each inner plate of said plurality of inner plates and each outer plate of said plurality of outer plates, said connecting pin being for connecting each inner plate of said plurality of inner plates to each outer plate of said plurality of outer plates;

an elastic seal member, wherein said elastic seal member covers an outer periphery of any one of each inner plate of said plurality of inner plates and each outer plate of said plurality of outer plates; and an annular sealing projection, wherein said annular sealing projection projects from said elastic seal member towards any one of said outer surface of each inner plate of said plurality of inner plates and said inner surface of each outer plate of said plurality of outer plates so as to about any one of said outer surface of each inner plate of said plurality of inner plates and said inner surface of each outer plate of said plurality of outer plates and so as to be in a surrounding relationship to said connection pin.

2. The chain with a seal as in claim 1, wherein said elastic seal member is separated at a front end of said elastic seal member and at a rear end of said elastic seal member so that said elastic seal member is secured to each inner plate of said plurality of inner plates and is prevented from falling off each inner plate of said plurality of inner plates, even if a thermal expansion coefficient of a material of said elastic seal member is different from a thermal expansion coefficient of a material of each inner plate of said plurality of inner plates.

3. A chain with a seal comprising:

a plurality of inner plates;

a plurality of outer plates, wherein each outer plate of said plurality of outer plates opposes each inner plate of said plurality of inner plates such that an inner surface of each outer plate of said plurality of outer plates faces an outer surface of each inner plate of said plurality of inner plates;

a connection pin located through a hole in each inner plate of said plurality of inner plates and through a hole in each outer plate of said plurality of outer plates so as to be perpendicular to each inner plate of said plurality of inner plates and each outer plate of said plurality of outer plates, said connecting pin being for connecting each inner plate of said plurality of inner plates to each outer plate of said plurality of outer plates;

a bushing surrounding a portion of said connection pin;

a roller surrounding a portion of said bushing, wherein said roller is rotatably fitted on an outer peripheral surface of said bushing through which said connection pin is inserted;

an elastic seal member, wherein said elastic seal member covers each inner plate of said plurality of inner plates of said chain so as to cover both said outer surface and an inner surface of each inner plate of said plurality of inner plates so as to form an outside portion of said elastic seal member and an inside portion of said elastic seal member and so as to cover a peripheral edge of each inner plate of said plurality of inner plates so as to connect said outside portion of said elastic seal member and said inside portion of said elastic seal member;

an annular sealing projection, wherein said annular sealing projection projects from said elastic seal member so as to abut said inner surface of each outer plate of said plurality of outer plates opposed said outer surface of each inner plate of said plurality of inner plates so as to surround a portion of said connection pin of said chain; and a buffer means, wherein said buffer means projects from said elastic seal member, for preventing a generation of noises upon collision of said roller with each inner plate of said plurality of inner plates caused by an axial free play of said roller.

\* \* \* \* \*